United States Patent
Lutz

(10) Patent No.: US 9,011,785 B2
(45) Date of Patent: Apr. 21, 2015

(54) EXHAUST-GAS TREATMENT UNIT HAVING HIGH-TEMPERATURE-RESISTANT COMPONENT OF HIGH-GRADE STEEL WITH A COBALT-CONTAINING COATING AND METHOD FOR PRODUCING SUCH AN EXHAUST-GAS TREATMENT UNIT

(71) Applicant: EMITEC Gesellschaft Fuer Emissionstechnologie mbH, Lohmar (DE)

(72) Inventor: Dieter Lutz, Meiningen (DE)

(73) Assignee: EMITEC Gesellschaft fuer Emissionstechnologies mbH, Lohmar (DE)

( * ) Notice: Subject to any disclaimer, the term of this patent is extended or adjusted under 35 U.S.C. 154(b) by 0 days.

(21) Appl. No.: 13/692,183

(22) Filed: Dec. 3, 2012

(65) Prior Publication Data
US 2013/0095003 A1    Apr. 18, 2013

Related U.S. Application Data

(63) Continuation of application No. PCT/EP2011/058109, filed on May 19, 2011.

(30) Foreign Application Priority Data

Jun. 2, 2010   (DE) .......................... 10 2010 022 503

(51) Int. Cl.
*B01D 53/34*    (2006.01)
*F01N 3/00*    (2006.01)
(Continued)

(52) U.S. Cl.
CPC ................ *F01N 13/16* (2013.01); *B01J 23/75* (2013.01); *B01J 37/0225* (2013.01); *B01J 37/0232* (2013.01); *B01J 37/0238* (2013.01); *B01J 37/038* (2013.01); *B23K 1/0014* (2013.01); *B23K 1/008* (2013.01); *B23K 1/19* (2013.01); *B23K 35/224* (2013.01);
(Continued)

(58) Field of Classification Search
USPC .......... 422/168, 177, 180; 428/679, 607, 606; 427/250, 496, 497, 508, 509, 585, 592, 427/593
See application file for complete search history.

(56) References Cited

U.S. PATENT DOCUMENTS 3,956,187 A   5/1976   Betz
4,055,706 A   10/1977  Galmiche et al.
(Continued)

FOREIGN PATENT DOCUMENTS

DE   2500404 A1    7/1975
DE   10023279 A1   11/2001
(Continued)

OTHER PUBLICATIONS

International Search Report of PCT/EP2011/058109, Sep. 7, 2011.

*Primary Examiner* — Walter D Griffin
*Assistant Examiner* — Jelitza Perez
(74) *Attorney, Agent, or Firm* — Laurence A. Greenberg; Werner H. Stemer; Ralph E. Locher

(57) ABSTRACT

A high-temperature-resistant component for an exhaust-gas treatment unit, an exhaust-gas treatment unit and a method for producing such a unit, include providing the component or the exhaust-gas treatment unit with a surface layer intended to prevent the formation of chromium carbide bridges during a brazing process for producing the exhaust-gas treatment unit.

8 Claims, 1 Drawing Sheet

(51) Int. Cl.
*F01N 13/16* (2010.01)
*B01J 23/75* (2006.01)
*B01J 37/02* (2006.01)
*B01J 37/03* (2006.01)
*B23K 1/00* (2006.01)
*B23K 1/008* (2006.01)
*B23K 1/19* (2006.01)
*B23K 35/22* (2006.01)
*B23K 35/30* (2006.01)
*F01N 3/28* (2006.01)
*B32B 15/01* (2006.01)
*C25D 3/12* (2006.01)

(52) U.S. Cl.
CPC .......... *B23K 35/226* (2013.01); *B23K 35/3046* (2013.01); *B23K 2201/02* (2013.01); *B23K 2203/04* (2013.01); *C25D 3/12* (2013.01); *F01N 3/281* (2013.01); *F01N 2330/04* (2013.01); *B32B 15/013* (2013.01)

(56) References Cited

U.S. PATENT DOCUMENTS

| | | | | |
|---|---|---|---|---|
| 4,260,654 | A | * | 4/1981 | Baldi .......................... 427/253 |
| 2010/0146948 | A1 | * | 6/2010 | DaCosta et al. ................ 60/295 |
| 2010/0184590 | A1 | | 7/2010 | Althöfer et al. |
| 2010/0209325 | A1 | | 8/2010 | Schwefer et al. |

FOREIGN PATENT DOCUMENTS

| | | |
|---|---|---|
| DE | 102007038711 A1 | 2/2009 |
| DE | 10 2007 042 618 A1 | 3/2009 |
| EP | 0303495 B1 * | 8/1992 |
| EP | 2 047 942 A1 | 4/2009 |

* cited by examiner

EXHAUST-GAS TREATMENT UNIT HAVING HIGH-TEMPERATURE-RESISTANT COMPONENT OF HIGH-GRADE STEEL WITH A COBALT-CONTAINING COATING AND METHOD FOR PRODUCING SUCH AN EXHAUST-GAS TREATMENT UNIT

CROSS-REFERENCE TO RELATED APPLICATION

This is a continuation, under 35 U.S.C. §120, of copending International Application No. PCT/EP2011/058109, filed May 19, 2011, which designated the United States; this application also claims the priority, under 35 U.S.C. §119, of German Patent Application DE 10 2010 022 503.7, filed Jun. 2, 2010; the prior applications are herewith incorporated by reference in their entirety.

BACKGROUND OF THE INVENTION

Field of the Invention

The present invention relates to a high-temperature-resistant component for use in an exhaust-gas treatment unit, an exhaust-gas treatment unit and a method for producing such an exhaust-gas treatment unit. The component is, in particular, a constituent part of a metallic honeycomb body which is assembled by using high-temperature soldering (also referred to as hard soldering or "brazing") in a vacuum or in protective gas.

Motor vehicles and utility vehicles must comply with a multiplicity of exhaust-gas regulations, which are adhered to through the use of correspondingly constructed exhaust systems. Exhaust systems are now known which have at least one exhaust-gas treatment unit that is formed at least partially with a metallic honeycomb body. The metallic honeycomb bodies are used inter alia as carrier or substrate bodies for catalytically active materials for coatings for storing an exhaust-gas component and/or as particle separators. For that purpose, the exhaust-gas treatment unit is generally at least partially coated in order to influence or convert different constituents of the exhaust gas at different locations in the exhaust system of a motor vehicle.

Within the metallic honeycomb bodies, connections are often produced through the use of a brazing process in a vacuum, in such a way that fixing of the individual components of the metallic honeycomb body to one another and/or to themselves, the formation of a honeycomb structure and/or the permanent positioning of the honeycomb structure in a housing is achieved.

Such metallic honeycomb bodies are formed, in particular, through the use of components composed of the following materials:
Metal foil
Structure: Ferrite
Composition: FeCrAl alloy with a chromium content of at least 12 wt. % and an aluminum content of at least 2.5 wt. %. Additives of rare earths, Y and/or Hf for controlling the formation of the $Al_2O_3$ cover layer are possible.
Material example: Materials with the number 1.4767 or 1.4725 as per the German Steel Key.
Material thickness: 20 μm [micrometers] to 150 μm.
Form: At least partially structured; smooth.
Housing
Structure: Austenite.
Material thickness: 0.1 mm [millimeters] to 3 mm.
Form: Cylindrical; oval; conical.
Brazing material:
Form: Brazing powder; brazing strip.
Composition: Nickel-based brazing material, wherein chromium, phosphorus and silicon are present as main additives. It is very particularly preferable for the fractions of the main additives to decrease in the following order: chromium, phosphorus, silicon. It is preferable for the chromium content of the nickel-based brazing material to be higher than the chromium fraction of the material of the honeycomb body, for example in the range from 23 to 25 wt. %. The main additives phosphorus and silicon should together not exceed the fraction of chromium.
Material example: Corresponding nickel-based brazing materials are available, for example under the name Nicrobraz from the company Wall Colmonoy Ltd.

During the production of the honeycomb bodies, it may be necessary for such brazed connections to be provided, or explicitly desired, only at certain locations. As a result of the partial brazed connection of the individual components to themselves and/or to one another, flexibility of the exhaust-gas treatment unit is maintained, in such a way that the exhaust-gas treatment unit can exhibit greater fatigue strength during use in the exhaust system of a motor vehicle despite the fluctuating temperatures and pressures prevailing in the exhaust system. The desired connecting points may be generated, for example, through the use of the (targeted) introduction of brazing material at certain positions of the honeycomb body and/or in the region between the honeycomb body and housing. In that connection, it is also known to apply a passivation layer to predetermined regions of the individual components of an exhaust-gas treatment unit, and to thus prevent undesired connections of the individual components to one another at those locations. In that regard, consideration has already been given to an undesired flow of brazing material and/or an undesired diffusion of the material element of the components.

Even though some measures have already been proposed for the targeted formation of connections and/or for the prevention of undesired secondary connections during the production of such honeycomb bodies which are assembled through the use of high-temperature brazing in a vacuum or in protective gas, there is also a demand, for mass production, to simplify that process, make it more reliable, make it less expensive and/or eliminate further disruptive influences for the brazing process.

SUMMARY OF THE INVENTION

It is accordingly an object of the invention to provide a high-temperature-resistant component of high-grade steel with a cobalt-containing coating, an exhaust-gas treatment unit and a method for producing such an exhaust-gas treatment unit, which overcome the hereinafore-mentioned disadvantages and at least partially solve the highlighted technical problems of the heretofore-known components, units and methods of this general type. In particular, it is sought to specify a high-temperature-resistant component and an exhaust-gas treatment unit which form a particularly exact and defined configuration of brazed connections and particularly effectively prevent undesired secondary connections during production. Furthermore, it is sought to specify a method for producing an exhaust-gas treatment unit in which the particularly exact and defined configuration of brazed connections, and an effective prevention of undesired secondary connections, can be attained in a reliable manner in terms of a process.

With the foregoing and other objects in view there is provided, in accordance with the invention, a high-temperature-resistant component suitable for use in an exhaust-gas treatment unit, the component comprising a material containing at least iron, chromium and aluminum, the component at least partially having a surface layer with at least cobalt, and the surface layer being applied by physical vapor deposition.

The high-temperature-resistant component is, in particular, a honeycomb body as described in the introduction or a constituent part of the honeycomb body. The suitability of the component as an exhaust-gas treatment unit is, in particular, distinguished by the component being able to permanently withstand the temperature fluctuations and dynamic demands and the corrosive environment in the exhaust system of a motor vehicle. In this case, it is possible for temperatures of up to 1,000° C. and/or considerable pressure pulses resulting from the combustion processes in the engine to act on the exhaust-gas treatment unit. It is self-evident that the demands apply not only to the components but rather also, in the assembled state, to the connections of the components to one another.

In this case, there is firstly proposed, in particular, a component which is prepared for the brazing process, and is also referred to as a semifinished part. The component may then be assembled, for example from components prepared in the same way, in one brazing process, and subsequently for example coated, according to the desired function of the exhaust-gas treatment unit.

With regard to the material, it is preferable to use an iron material which has chromium and aluminum as main alloy elements, wherein the chromium fraction is greater than the aluminum fraction at least by a factor of 3. In this case, it is very particularly preferable for the chromium fraction to lie, for example, in the range from 12 to 25 wt. %, while the aluminum fraction lies, for example, in the range from 2.5 to 6 wt. %. Furthermore, for this purpose, materials such as those which have already been mentioned in the introduction may be used with regard to the metal foil and/or the housing, so that the description is referred to in its entirety herein.

The surface layer includes at least cobalt (Co, atomic number 27) and is composed, in particular, exclusively of cobalt and/or of a cobalt oxide (for example $Co_3O_4$). In this case, impurities may also be tolerated in each case to a small or conventional degree. The surface layer preferably covers those regions of the area of contact between the components and other components or parts in which a brazed connection is not desired. It is, however, also possible for one surface (or a plurality of surfaces or even all of the surfaces) of the component to be formed with a corresponding surface layer, in such a way that the brazed connections are subsequently located thereon. The surface layer should be closed, that is to say in particular it should not form any significant pores through to the base material of the component. In particular, the cobalt surface layer is not formed as a catalyst layer, in particular it is not formed for the conversion of pollutants in an exhaust gas.

As a cover layer, the surface layer now has the effect that the elements chromium and iron, as main constituents of the base material of the component, firstly no longer lie on the surface. It is known that both chromium and iron have a very high affinity to carbon, and if carbon is available there under brazing conditions, chromium carbide formation (iron chromium carbide formation) inevitably occurs. By contrast, cobalt does not form carbides. Cobalt can be mixed fully with chromium and iron, but itself has no catalytic function. At the areas of contact of the component with other components or individual parts or with itself, depending on the local availability of carbon, firmly adherent chromium carbide bridges (secondary connections, diffusion connections) are formed during the brazing process. Under unfavorable circumstances, a spatially finely distributed carbide skeleton is thus formed which fixedly welds the component to itself, to other components or other individual parts, and thus influences the flexibility of the configuration of the component, for example in an exhaust-gas treatment unit, that is to say the flexibility of the exhaust-gas treatment unit itself. The mechanism of action of the chromium carbide formation is thus disrupted or inhibited by the application of a surface layer which isolates the chromium. This will be explained below.

Components to be brazed, such as metal foils and a housing, may have residues of carbon-containing liquids such as, for example, rolling oil or shaft oil and fixing. As a result of capillary effects, the liquids retreat into gusset regions, for example between corrugated and smooth layers, thus wetting both foil pairs (components). After transfer into a vacuum brazing plant, an evacuation begins, together with a continuous increase in temperature. A combustion of the liquids after the burning point is reached is no longer possible as a result of the lack of oxygen, so that from approximately 400° C. upward, a cracking process occurs which results in the formation of pure, highly reactive carbon. The cracking process also takes place in the case of the generation or production of the brazed connections in protective gas, because in this case, too, the oxygen is displaced and carbon-containing production media are cracked. The carbon is converted, with the chromium on component surfaces which bear against one another, to form chromium carbide or iron chromium carbide, and thus connects the two components permanently through the use of a carbide bridge. The carbide bridge formation cannot be broken down even at the conventional brazing temperatures of over 1050 degrees, and furthermore, the alloy of the base material of the component then has a chromium deficit. In the critical temperature range of approximately 400 to 800° C., in which the chromium carbides are formed, the cobalt of the surface layer already mixes with the base material of the component, but forms a more closed cover layer which isolates the alloy constituent chromium from the surface of the component and thus prevents chromium carbide formation. After the temperature range is exceeded, in a particularly advantageous embodiment of the invention, the cobalt of the surface layer has mixed with the base material of the component to such an extent that at least aluminum is available on the surface of the component, and the formation of an aluminum oxide cover layer is permitted. The aluminum oxide layer is formed by the alloy constituent aluminum, which is contained in the base material of the component, at temperatures over 700° C., and has in particular a thickness of less than one micrometer. The aluminum oxide cover layer serves as a diffusion barrier for substances infiltrating into the component from the outside, and generates the corrosion resistance of the component. The actual brazing process takes place after a further temperature increase, at temperatures of over 900° C.

The surface layer was applied through the use of a process of physical vapor deposition, also referred to as a PVD (physical vapor deposition) process. From this it is evident that the surface layer is applied particularly thinly and uniformly, and accordingly a precise thickness of the surface layer can be generated which is adapted to the respective application.

Through the use of the surface layer proposed according to the invention, the direct contact of carbon, in particular with the elements chromium and iron of the base material of the component, is prevented. A possibly undesired connection between the surfaces of the individual parts thus does not take place, so that an exhaust-gas treatment unit can be produced in which connections between the individual parts of the surfaces to one another are generated only at the desired connecting points/contact points, which are provided with brazing material. It is thus possible, for example, that different coefficients of thermal expansion of the individual components or individual parts of an exhaust-gas treatment unit do not lead to failure of the connections between the components or parts as a result of locally different changes in length. The changes in length can be compensated through the use of components which are, in part, freely movable relative to one another. Furthermore, the vibration behavior of the parts can thus be precisely set.

In accordance with another advantageous feature of the invention, the component is at least one of the group including metal foil and housing. Specifically for the production of metallic honeycomb bodies, it is possible for a plurality of (at least partially structured) metal foils and (at least) one housing to be prepared in this way. The metal foil provided in this case has, in particular, a thickness of between 5 μm and 100 μm [micrometers]. If the component is in the form of a housing, thicknesses of 0.3 to 3 mm [millimeters] are provided in this case. With regard to the configuration of the metal foil or of the housing, reference may (alternatively or additionally) be made to the explanations provided at the start of this description in their entirety.

In accordance with a further advantageous feature of the component of the invention, the thickness of the surface layer is at most 5 μm [micrometers]. It is very particularly preferable for the thickness of the surface layer to be at most 1 μm [micrometers] or even at most 100 nm [nanometers]. The layer thicknesses specified herein are advantageous in particular because, through the use of such a thin surface layer, the formation of the oxidic cover layer which forms from the alloy composition of the base material of the component is not hindered or is hindered only to a limited extent. A thickness of greater than 5 μm should be avoided because then, an oxidic cover layer is no longer formed uniformly, and corresponding high-temperature corrosion resistance as a result of the oxidic cover layer (in particular an $Al_2O_3$ layer) is no longer ensured. Furthermore, through the use of the oxidic cover layer, an adequate roughness of the surface is provided in such a way that a retroactively applied coating (for example a washcoat) has good adhesion properties. A thickness of less than 100 nm should likewise not be provided because then, a prevention of carbide bridge formation cannot be reliably attained.

In one advantageous refinement, the base material of the component, that is to say the component without a surface layer, has no cobalt. This means, in particular, that the surface layer has not been generated through the use of deposition from the base material, and/or is not formed by the cobalt-containing base material.

With the objects of the invention in view, there is also provided an exhaust-gas treatment unit for use in an exhaust system, comprising at least one component composed of a material containing at least iron, chromium and aluminum. The component at least partially has a surface layer with at least cobalt and is connected at connecting points to itself or to other individual parts of the exhaust-gas treatment unit. The connecting points are generated by brazing. The component additionally has a coating applied to the surface layer.

With regard to the ambient conditions in an exhaust system, reference is made to the explanations given above, and likewise to the demands, specified therein, placed on the exhaust-gas treatment unit. The component specified herein is, in particular, the component already described further above with a surface layer according to the invention. It is, however, basically not important in this case which method was used to form the at least partial surface layer on the component.

The applied surface layer which has at least cobalt serves in this case, in particular, exclusively for preventing chromium carbide bridges at the connecting points. The surface layer is, in particular, not provided for forming a catalytically active substance, through oxide formation, for exhaust-gas purification. This is rather achieved, in the exhaust-gas treatment unit described herein, through the provision of a coating also applied at least partially to the surface layer which coating, if appropriate, exhibits corresponding catalytic activity and/or is provided with corresponding properties (conversion, accumulation, storage of exhaust-gas constituents). It is thus desirable, in particular, for the surface layer not to come into contact with the exhaust gas itself during use. Such contact can be prevented specifically through the use of the 2-tier layer if the surface layer is positioned (only) between the base material of the component and the coating and/or between the base materials of adjacent components and/or the base material and the brazing material.

In accordance with another particularly advantageous feature of the invention, the coating ensures that at least the cobalt in the surface layer is (substantially) inert with respect to an exhaust gas. In other words, this means for example that the element cobalt (Co) and/or cobalt compounds (for example cobalt oxides) in the surface layer are not catalytically active with respect to an exhaust gas during use of the exhaust-gas treatment unit. In this case, the element cobalt serves (substantially) exclusively for preventing chromium carbide bridges between adjacent components which make contact with one another. The coating thus (also) has the function of reducing any catalytic activity of the cobalt or of the cobalt compounds with respect to constituents of the exhaust gas to such an extent that, at most, there is negligible assistance of the exhaust-gas conversion or the assistance is eliminated entirely.

In particular, with certain coatings, it cannot be ensured (for example due to diffusion processes) that the coating completely covers the surface layer with respect to an exhaust gas during use of the exhaust-gas treatment unit in such a way that there is no catalytic activity whatsoever of the cobalt or of the cobalt compounds. The present invention may, however, also encompass such coatings if the coating (virtually exclusively) performs the catalytic function of the exhaust-gas treatment unit and the surface layer is correspondingly provided (virtually exclusively) for preventing chromium carbide bridges.

In accordance with a further particularly advantageous feature of the invention, the coating (practically) completely covers the surface layer and is gas-tight to such an extent that the surface layer does not come into contact with an exhaust gas during use of the exhaust-gas treatment unit. In this case, "gas-tight" means, in particular, that constituents of the exhaust gas cannot penetrate through the coating to the surface layer, in such a way that a catalytic reaction between the surface layer, in particular with cobalt and cobalt compounds, and constituents of the exhaust gas does not take place (to a significant degree).

In accordance with an added advantageous feature of the invention, the coating of the exhaust-gas treatment unit includes at least washcoat. Washcoat typically includes at least one incombustible oxide carrier, such as for example activated aluminum oxide ($Al_2O_3$) and one or more platinum group metal components such as for example platinum, palladium, rhodium, ruthenium and/or iridium. Further additives are often added, such as promoters and washcoat stabilizers.

The washcoat provides, in particular, a particularly large contact area for the exhaust gas. The washcoat is, in particular, first applied (at least partially) to the exhaust-gas treatment unit after the assembly process for forming an exhaust-gas treatment unit, that is to say also after the formation of the connections through the use of a brazing process in a vacuum or in protective gas.

With the objects of the invention in view, there is furthermore provided a method for producing an exhaust-gas treatment unit having at least one corrosion-resistant and high-temperature-resistant component, the component being composed of a material containing at least iron, chromium and aluminum. The method comprising at least the following steps:

providing at least one component;
at least partially applying a surface layer at least having cobalt;
generating brazed connections at connecting points on the component by applying brazing material and brazing in a vacuum or in protective gas; and
applying a washcoat at least to the component.

In this case, the component or exhaust-gas treatment unit discussed herein may preferably be constructed as proposed herein according to the invention. It is furthermore preferable for the above steps to be performed in the specified sequence, wherein it is clear that, for example, additional handling processes, deformation processes and transportation processes may be performed between the steps.

In the first step, for example, firstly the components and/or individual parts of the exhaust-gas treatment unit to be joined are placed together or provided. After it is clear which components/individual parts are to be provided locally with a cobalt surface layer, the step can be performed.

The components/individual parts can then be disposed relative to one another and/or deformed so as to assume a joining position. The configuration of the at least one component for producing an exhaust-gas treatment unit includes the provision of the component, for example, in the form of a housing for receiving a honeycomb structure or further individual parts such as, for example, an additional casing or the like disposed between the housing and honeycomb structure. The configuration may furthermore include the layering and/or coiling and/or winding of the at least one component either with other individual parts, for example metal foils, fibrous nonwovens, further components or the like, or with itself so as to form a honeycomb body through which the exhaust gas can flow.

The brazing material can then, for example, be applied before, during and/or after the step. This is then preferably followed by the brazing through the use of a high temperature and a vacuum or in protective gas (preferably argon), in such a way that the components/individual parts are permanently connected, for use in the exhaust system, by brazed connections (only) at the desired connecting points.

After the completion of the brazing process, the at least partial application of a washcoat additionally takes place. The washcoat is formed, in particular, in the inner regions, such as for example in the channels of a honeycomb structure, on the metal foils (and on the surface layer) in such a way that the exhaust-gas treatment unit can be formed with corresponding and also different coatings.

In accordance with a concomitant preferable mode of the invention, the application of the surface layer takes place through the use of galvanic coating or through the use of physical vapor deposition.

The surface layer which has at least cobalt may be applied to the at least one component through the use of various processes. The processes include, in particular, at least one of the following production methods:
plating,
CVD (chemical vapor deposition) processes,
electrolytic or galvanic coating processes,
dipping into a liquid coating material,
powder coating.

A PVD process or physical vapor deposition process is particularly advantageous because, in this case, it is possible to generate particularly thin and uniform surface layers on the component. The group of processes of physical vapor deposition include, in particular, the processes listed below:
1) evaporation processes such as, in particular:
thermal evaporation (also referred to as vaporization technique),
electron beam evaporation,
laser beam evaporation,
arc evaporation,
2) sputtering such as, in particular:
ion-beam-assisted deposition,
3) ion plating.

In particular, the washcoat performs the function of rendering at least the element cobalt and/or cobalt compounds inert with respect to an exhaust gas during use of the exhaust-gas treatment unit. This means, in particular, that catalytic reactions between the element cobalt and/or cobalt compounds and constituents of the exhaust gas are (substantially) prevented by the coating with the washcoat. In particular, the washcoat is therefore constructed to be gas-tight to such an extent that, during use of the exhaust-gas treatment unit, contact at least between the element cobalt and/or cobalt compounds in the surface layer and constituents of the exhaust gas is prevented.

The descriptions relating to the aspects of the invention (component, exhaust-gas treatment unit, method) may be taken into consideration for more precise specification of one another or explanation of one another.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being specified. In particular, features which are directed to the high-temperature-resistant component, to the exhaust-gas treatment unit or to the method may be combined with one another or transferred to the respective other aspects of the invention.

Although the invention is illustrated and described herein as embodied in a high-temperature-resistant component of high-grade steel with a cobalt-containing coating, an exhaust-gas treatment unit and a method for producing such an exhaust-gas treatment unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
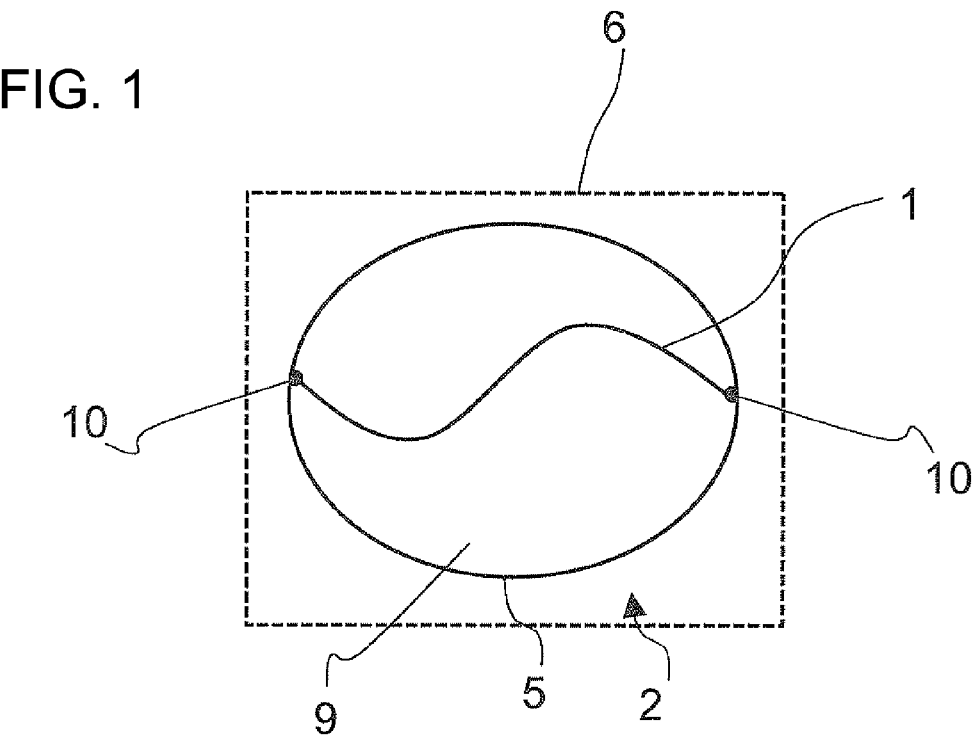
FIG. 1 is a diagrammatic, cross-sectional view of an exhaust system having an exhaust-gas treatment unit.

Referring now to the figures of the drawings in detail and first, particularly, to FIG. 1 thereof, there is seen an exhaust system 6 having an exhaust-gas treatment unit 2 disposed therein. The exhaust-gas treatment unit 2 is formed by a housing 5 in which a component 1 is accommodated. The component 1 is connected to the housing 5 at numerous connecting points 10. As a result of the configuration of the component 1 in the housing 5, a honeycomb body 9 having a multiplicity of channels through which an exhaust gas can flow is formed. Such metallic honeycomb bodies have already been described many times, in particular in previous patent publications from the Applicant of the instant application Emitec Gesellschaft fur Emissionstechnologie MbH of Lohmar, Germany as well. These may be taken into consideration for the characterization of such metallic honeycomb bodies.

Figure 2:
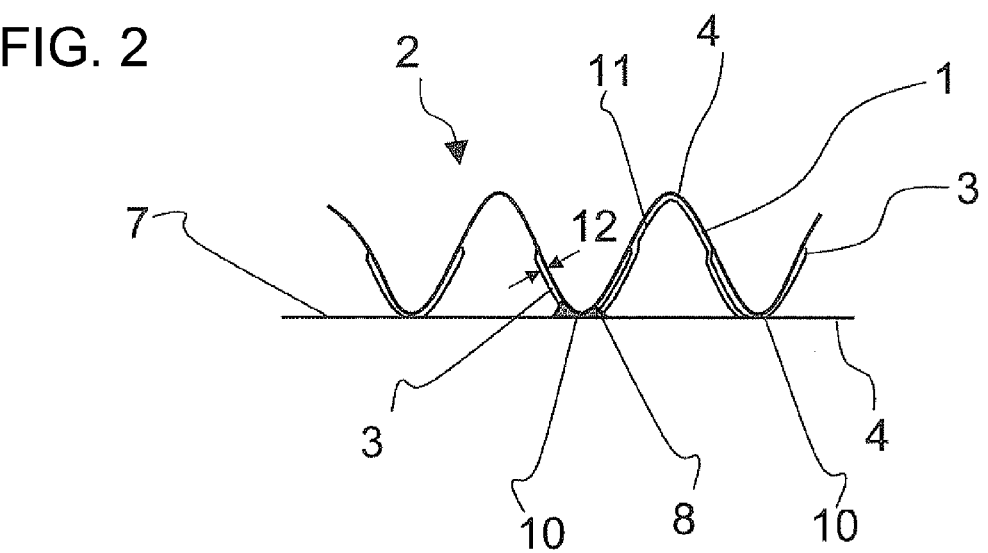
FIG. 2 is a cross-sectional view of a component.

FIG. 2 diagrammatically shows a component 1, which in this case is in the form of a structured metal foil 4. The component is connected to a further individual part 7 (for example a smooth metal foil or a nonwoven) of an exhaust-gas treatment unit 2, at least partially through the use of brazed connections 8, at connecting points 10. The component 1 partially has a surface layer 3 with a (uniform) thickness 12, in such a way that the formation of chromium carbide bridges in the region of the connecting points 10 or the adjacent areas of contact between the component 1 and the individual part 7 is prevented. Furthermore, the component 1 additionally partially has a coating 11 on the surface layer 3 and/or directly on the base material of the component 1.

The invention claimed is:

1. An exhaust-gas treatment unit for an exhaust system, the exhaust-gas treatment unit comprising:
   - at least one component formed of a material containing at least iron, chromium and aluminum, said at least one component at least partially having a surface layer at least containing cobalt, said cobalt-containing surface layer preventing formation of carbides during high-temperature brazing processes;
   - other components;
   - other individual parts;
   - brazed connecting points connecting said at least one component to itself or to said other individual parts;
   - at least said component having a coating applied to said surface layer;
   - an area of contact between said at least one component and said other components or said other individual parts, said area of contact having regions in which a brazed connection is not desired; and
   - said surface layer covering at least said regions of said area of contact in which a brazed connection is not desired.

2. The exhaust-gas treatment unit according to claim 1, wherein said coating renders at least the cobalt in said surface layer inert with respect to an exhaust gas.

3. The exhaust-gas treatment unit according to claim 1, wherein said coating completely covers said surface layer and is gas-tight to such an extent that, during use of the exhaust-gas treatment unit, said surface layer is not in contact with an exhaust gas.

4. The exhaust-gas treatment unit according to claim 1, wherein said coating includes at least washcoat.

5. A method for producing an exhaust-gas treatment unit, the method comprising the following steps:
   - providing at least one corrosion-resistant and high-temperature-resistant component formed of a material containing at least iron, chromium and aluminum;
   - providing other components and other individual parts;
   - providing an area of contact between the at least one component and the other components or the other individual parts, the area of contact having regions in which a brazed connection is not desired;
   - at least partially applying a surface layer at least containing cobalt to the at least one component, covering at least the regions of the area of contact in which a brazed connection is not desired, with the surface layer, and preventing formation of carbides during high-temperature brazing processes due to the cobalt-containing surface layer;
   - producing brazed connections at connecting points on the at least one component by brazing in a vacuum or in a protective gas; and
   - applying a washcoat at least to the at least one component.

6. The method according to claim 5, which further comprises carrying out the step of applying the surface layer by galvanic coating or physical vapor deposition.

7. The method according to claim 5, which further comprises rendering at least the cobalt in the surface layer inert with respect to an exhaust gas due to the coating.

8. The method according to claim 5, which further comprises including at least washcoat in the coating.

* * * * *